United States Patent
Liu et al.

(10) Patent No.: US 10,379,685 B2
(45) Date of Patent: Aug. 13, 2019

(54) TOUCH ELECTRODE STRUCTURE, TOUCH PAD, AND METHOD FOR FABRICATING THE TOUCH ELECTRODE STRUCTURE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Xuening Liu, Shanghai (CN); Chen Liu, Shanghai (CN); Yu Cai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 204 days.

(21) Appl. No.: 15/487,437

(22) Filed: Apr. 14, 2017

(65) Prior Publication Data

US 2017/0220155 A1 Aug. 3, 2017

(30) Foreign Application Priority Data

Dec. 12, 2016 (CN) .......................... 2016 1 1139468

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

| 5,854,125 A | * | 12/1998 | Harvey | ............. H01L 21/31053 |
| | | | | 438/626 |
| 2010/0045625 A1 | * | 2/2010 | Yang | ....................... G06F 3/044 |
| | | | | 345/173 |

(Continued)

FOREIGN PATENT DOCUMENTS

| CN | 101788875 A | 7/2010 |
| CN | 102236492 A | 11/2011 |

(Continued)

*Primary Examiner* — Dorothy Harris
(74) *Attorney, Agent, or Firm* — Kilpatrick Townsend & Stockton LLP

(57) ABSTRACT

A touch electrode structure including first and second touch electrodes alternately arranged at same layer is provided. The touch electrode further includes first and second connecting sections electrically connecting adjacent first or second touch electrodes arranged in a first direction or a second direction, respectively. The first connecting sections and the second connecting sections overlap in some areas. A first insulating medium is arranged between the first touch electrodes and the second touch electrodes for insulation of the two. A second insulating medium is arranged between the first connecting sections and the second connecting sections in the overlapping areas for insulation of the two. The thickness of the second insulating medium, of the first connecting sections in the overlapping areas and of the second connecting sections in the overlapping areas is each less than a thickness of the first touch electrodes, and of the second touch electrodes.

19 Claims, 8 Drawing Sheets

(56) References Cited

U.S. PATENT DOCUMENTS

| | | | |
|---|---|---|---|
| 2012/0044191 A1* | 2/2012 | Shin | G06F 3/044 345/174 |
| 2012/0146942 A1* | 6/2012 | Kamoshida | G06F 3/044 345/174 |
| 2014/0307177 A1* | 10/2014 | Burberry | G06F 3/044 349/12 |
| 2015/0062060 A1* | 3/2015 | Kim | G06F 3/044 345/174 |
| 2015/0253915 A1* | 9/2015 | Hoang | G06F 3/0412 345/173 |
| 2015/0309615 A1* | 10/2015 | Liu | G06F 3/044 345/174 |
| 2016/0179233 A1* | 6/2016 | Li | G06F 3/044 345/173 |
| 2016/0291776 A1* | 10/2016 | Li | G06F 3/0416 |
| 2017/0038890 A1* | 2/2017 | Ma | G06F 3/0412 |
| 2018/0099520 A1* | 4/2018 | Hildreth | B41M 5/0017 |
| 2018/0341348 A1* | 11/2018 | Zeng | G06F 3/044 |
| 2018/0356925 A1* | 12/2018 | Liu | G02F 1/13338 |

FOREIGN PATENT DOCUMENTS

| | | |
|---|---|---|
| CN | 104375734 A | 2/2015 |
| CN | 104679340 A | 6/2015 |
| CN | 104391610 A | 12/2016 |
| CN | 106201136 A | 12/2016 |
| EP | 2843517 A1 | 3/2015 |
| TW | 201512958 A | 4/2015 |

* cited by examiner

--Prior Art--

--Prior Art--

TOUCH ELECTRODE STRUCTURE, TOUCH PAD, AND METHOD FOR FABRICATING THE TOUCH ELECTRODE STRUCTURE

CROSS-REFERENCE TO RELATED APPLICATION

This application claims priority of Chinese Patent Application No. 201611139468.4, filed on Dec. 12, 2016, which is hereby incorporated by reference in its entirety.

FIELD

The present invention relates to the field of display technologies, and particularly to a touch electrode structure, a touch pad, and a method for fabricating the touch electrode structure.

BACKGROUND

In recent years, the touch sensing technologies have been developing rapidly, and the existing common touch pads include resistive, capacitive, optical, and other touch pads, where the capacitive touch pad has become a predominant touch pad applied to various electronic products. In the prior art, there is such a mutual-capacitive touch structure where touch sensing electrodes and touch driving electrodes are arranged at the same layer that the touch electrodes in the same row or the same column need to be electrically connected using a metal bridge structure, and as illustrated in FIG. 1, vertically arranged touch sensing electrodes 1 are electrically connected using metal bridges 3, and horizontally arranged touch driving electrodes 2 overlap with the metal bridges 3 in such an overlapping area that is structured as illustrated in FIG. 2 showing a cross section along AA' in FIG. 1, where the touch sensing electrode 1 and the touch driving electrode 2 are insulated from each other by an insulating layer 4 in the overlapping area corresponding to the metal bridge 3, and the touch driving electrode and the touch sensing electrode have the same thickness in a bridge area 5; and since there are the insulating layer and the metal bridge further arranged above the touch driving electrode, the height of the bridge area is more than the height of the touch sensing electrode 1 or the touch driving electrode 2.

In summary, the height of the touch electrode in the bridge area is more than the height outside the bridge area in the prior art, thus resulting in poor planarity of the surface of the touch electrode structure, poor uniformity of the thickness of the touch electrode layer, and optical non-uniformity of the touch electrode layer.

SUMMARY

Embodiments of the invention provide a touch electrode structure, a touch pad, and a method for fabricating the touch electrode structure so as to improve the planarity of the surface of the touch electrode structure to thereby improve the uniformity of the thickness of the touch electrode structure, thus resulting in optical uniformity of the touch electrode structure.

An embodiment of the invention provides a touch electrode structure including first touch electrodes and second touch electrodes alternately arranged at a same layer, wherein the touch electrode structure further includes:

first connecting sections electrically connecting adjacent first touch electrodes arranged in a first direction; and second connecting sections electrically connecting adjacent second touch electrodes arranged in a second direction, wherein the first connecting sections and the second connecting sections overlap with each other in overlapping areas;

a first insulating medium between the first touch electrodes and the second touch electrodes such that the first insulating medium insulates the first touch electrodes and the second touch electrodes from each other;

a second insulating medium between the first connecting sections and the second connecting sections in the overlapping areas such that the second insulating medium insulates the first connecting sections and the second connecting sections from each other; and each of a thickness of the second insulating medium, a thickness of the first connecting sections in the overlapping areas and a thickness of the second connecting sections in the overlapping areas is not only less than a thickness of the first touch electrodes, but also less than a thickness of the second touch electrodes.

With the touch electrode structure according to this embodiment of the invention, the first insulating medium is arranged between the first touch electrodes and the second touch electrodes so that the touch electrode structure can be made planar as a whole; and the thickness of the second insulating medium, and the thicknesses of the first connecting sections and the second connecting sections are made smaller in the overlapping areas to thereby reduce the thickness of the overlapping areas as compared with the prior art so as to improve the planarity of the surface of the touch electrode structure, and the uniformity of the thicknesses of the touch electrodes, thus resulting in optical uniformity of the touch electrode structure.

An embodiment of the invention provides a touch panel including the touch electrode structure above.

An embodiment of the invention provides a method for fabricating the touch electrode structure above, the method including:

forming a touch electrode layer including first touch electrodes, second touch electrodes, and first connecting connections electrically connecting adjacent first touch electrodes arranged in a first direction;

forming a first insulating medium and a second insulating medium, wherein the first insulating medium is located between the first touch electrodes and the second touch electrodes; and forming second connecting sections electrically connecting adjacent second touch electrodes arranged in a second direction, wherein the second connecting sections and the first connecting sections overlap with each other in overlapping areas;

the second insulating medium insulates the first connecting sections and the second connecting sections from each other; and each of a thickness of the second insulating medium, a thickness of the first connecting sections in the overlapping areas and a thickness of the second connecting sections in the overlapping areas is not only less than a thickness of the first touch electrodes, but also less than a thickness of the second touch electrodes.

BRIEF DESCRIPTION OF THE DRAWINGS

In order to make the technical solutions in the embodiments of the invention more apparent, the drawings to be used in a description of the embodiments will be briefly introduced below, and apparently the drawings to be described below are merely illustrative of some embodiments of the invention, and those ordinarily skilled in the art can derive other drawings from these drawings without any inventive effort. In the drawings.

DETAILED DESCRIPTION OF THE EMBODIMENTS

Embodiments of the invention provide a touch electrode structure, a touch pad, and a method for fabricating the touch electrode structure so as to improve the planarity of the surface of the touch electrode structure to thereby improve the uniformity of the thickness of the touch electrode structure, thus resulting in optical uniformity of the touch electrode structure.

Figure 1:
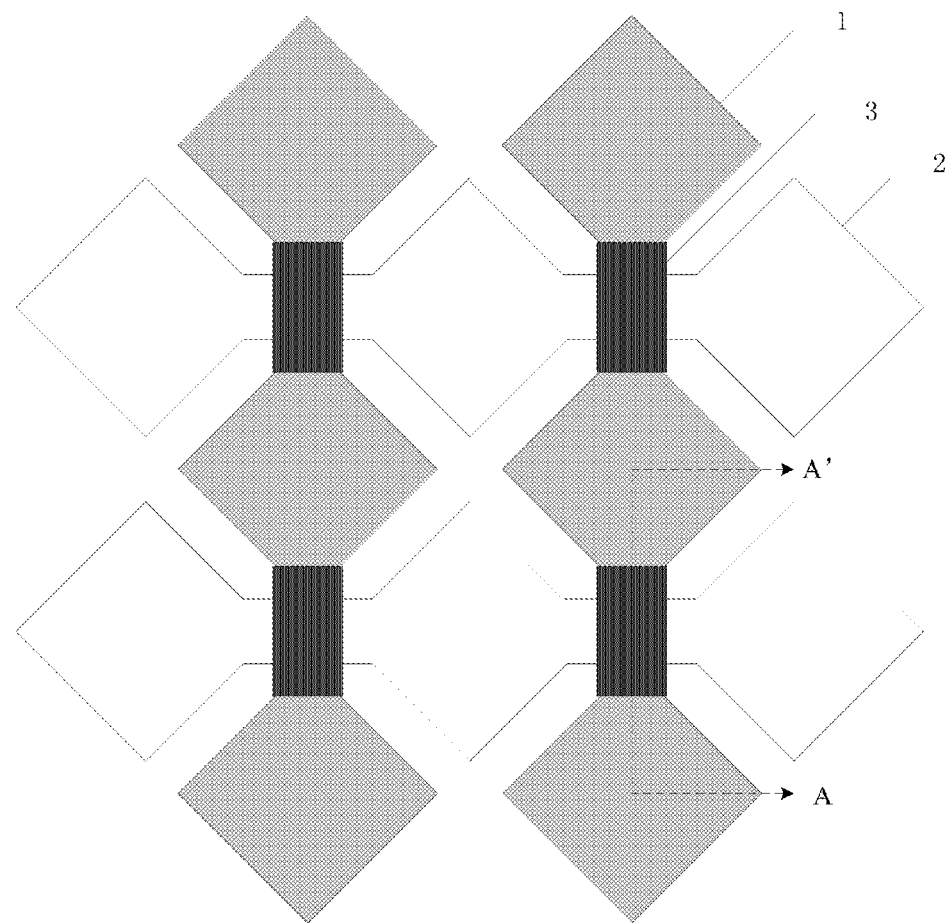
FIG. 1 is a schematic diagram of the touch electrode structure in the prior art.
Figure 2:
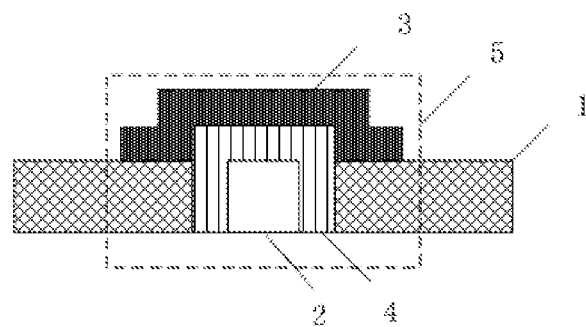
FIG. 2 is a schematic diagram of the touch electrode in the bridge area in the prior art.
Figure 3:
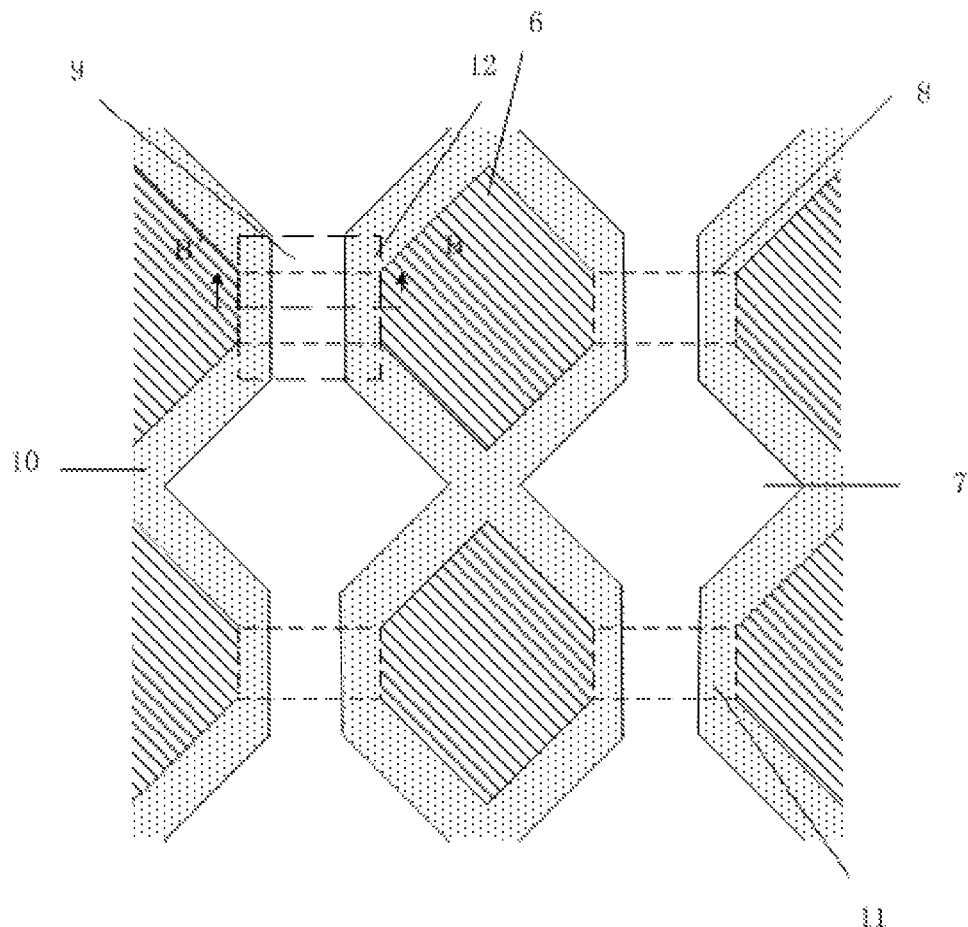
FIG. 3 is a schematic diagram of a touch electrode structure according to an embodiment of the invention.

An embodiment of the invention provides a touch electrode structure, and FIG. 3 illustrates a top view of the touch electrode structure including first touch electrodes 6 and second touch electrodes 7 alternately arranged at the same layer, and further including:

First connecting sections 8 electrically connecting the adjacent first touch electrodes 6 arranged in a first direction; and Second connecting sections 9 electrically connecting the adjacent second touch electrodes 7 arranged in a second direction, where the first connecting sections and the second connecting sections overlap with each other in overlapping areas 12, that is, projections of the first connecting sections and the second connecting sections in the direction perpendicular to a panel overlap with each other;

There are such a first insulating medium 10 between the first touch electrodes 6 and the second touch electrodes 7 that insulates the first touch electrodes 6 and the second touch electrodes 7 from each other;

There are such a second insulating medium 11 between the first connecting sections 8 and the second connecting sections 9 in the overlapping areas 12 that insulates the first connecting sections and the second connecting sections from each other; and Each of a thickness of the second insulating medium, a thickness of the first connecting sections in the overlapping areas and a thickness of the second connecting sections in the overlapping areas is not only less than a thickness of the first touch electrodes, but also less than a thickness of the second touch electrodes.

Figure 4:
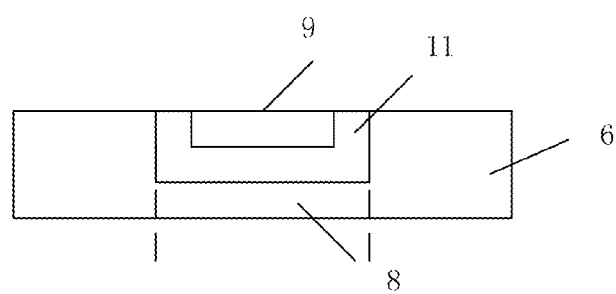
FIG. 4 is a schematic structural diagram of a touch electrode structure in an overlapping area according to an embodiment of the invention.

It shall be noted that since there are the second insulating medium and the second connecting sections arranged above the first connecting sections, the first connecting sections are invisible in the top view of the touch electrode structure, and the positions of the first connecting sections are only represented as dotted lines in FIG. 3;

FIG. 4 illustrates the structure in FIG. 3 taken along BB', there is such the second insulating medium 11 between the first connecting section 8 and the second connecting section 9 in the overlapping area that insulates the first connecting section 8 and the second connecting section 9 from each other;

In the touch electrode structure according to this embodiment of the invention, the first insulating medium is arranged between the first touch electrodes and the second touch electrodes so that the touch electrode structure can be made planar as a whole; and the thickness of the second insulating medium, and the thicknesses of the first connecting sections and the second connecting sections are made smaller in the overlapping areas to thereby reduce the thickness of the overlapping areas as compared with the prior art so as to improve the planarity of the surface of the touch electrode structure, and the uniformity of the thicknesses of the touch electrodes, thus resulting in optical uniformity of the touch electrode structure. With the technical solution according to this embodiment, the surface of the touch electrode structure can be made planar without any non-uniformity thereof, thus improving the freedom in setting the touch electrode structure without affecting the quality of a picture displayed on the display panel. It shall be noted that in the technical solution according to this embodiment of the invention, the technical object and effect of uniform optical performance to be attained by this embodiment of the invention will be achieved only if all of the thicknesses of the first connecting sections, the second connecting sections, and the second insulating medium are not only less than the thicknesses of the first touch electrodes, but also less than the thickness of the second touch electrodes, and the first insulating medium is filled between the first touch electrodes and the second touch electrodes. Optionally the first insulating medium and the second insulating medium can be formed integrally, and if the first insulating medium and the second insulating medium are formed integrally, then the cost of the process will be lowered on one hand, and the integrity of the touch electrode structure will be improved on the other hand to thereby improve optical uniformity of the touch electrode structure.

Optionally the first touch electrodes and the first connecting sections are formed integrally, and/or the second touch electrodes and the second connecting sections are formed integrally.

In the prior art the bridges electrically connecting the touch sensing electrodes are generally metal wires such that they may come with being broken as a result of a poor contact. With the touch electrode structure according to this embodiment of the invention, if the first touch electrodes and the first connecting sections are formed integrally, and the second touch electrodes and the second connecting sections are formed integrally, then a disconnection will not be occurred between the touch sensing electrodes as a result of a poor contact between the electrode sections and the connecting sections. The first connecting sections, the first touch electrodes, the second connecting sections, and the second touch electrodes can be made of the same material, and optionally all of them can be made of Indium Tin Oxide (ITO), thus resulting in good optical uniformity of the touch electrode structure while avoiding the metal bridged electrodes from being visible in the prior art.

Optionally there are the same thicknesses of the second touch electrodes, the first touch electrodes, and the first insulating medium.

In this way, the surface of the touch electrode structure can be made planar outside the overlapping areas of the touch electrode structure.

Optionally the difference between the total thickness of the second insulating medium, and the first connecting sections, and the second connecting sections in the overlapping areas, and the thickness of the second touch electrodes is less than or equal to 15% of the thickness of the second touch electrodes; or The difference between the total thickness of the second insulating medium, and the first connecting sections, and the second connecting sections in the overlapping areas, and the thickness of the first touch electrodes is less than or equal to 15% of the thickness of the first touch electrodes.

Optionally in an example of this solution where the difference between the total thickness of the second insulating medium, and the first connecting sections, and the second connecting sections in the overlapping areas, and the thickness of the second touch electrodes is less than or equal to 10% of the thickness of the second touch electrodes; or the difference between the total thickness of the second insulating medium, and the first connecting sections, and the second connecting sections in the overlapping areas, and the thickness of the first touch electrodes is less than or equal to 10% of the thickness of the first touch electrodes, if the difference between their total thickness in the overlapping areas, and the thickness of the first touch electrode or the second touch electrode is less than 10% of the thickness of the first touch electrode or the second touch electrode, then the surface of the touch electrode structure will be made relatively planar, there will be good uniformity of the thickness, and optical uniformity of the touch electrode structure. If light rays of a display pixel pass a medium with a 10% difference in thickness thereof, then there will be such an insignificant difference in transmittivity of the light rays that is hardly observable to human eyes. If the difference between the total thickness of the second insulating medium, and the first connecting sections, and the second connecting sections in the overlapping areas, and the thickness of the second touch electrodes is more than 15% of the thickness of the second touch electrodes; or the difference between the total thickness of the second insulating medium, and the first connecting sections, and the second connecting sections in the overlapping areas, and the thickness of the first touch electrodes is more than 15% of the thickness of the first touch electrodes, then there will be such a significant difference in thickness between the overlapping areas and the other areas than the overlapping areas that the surface of the touch electrode structure is made uneven, so that the subsequent process may become difficult on one hand, and optical uniformity of a picture being displayed may be so degraded on the other hand that light exiting the display panel may be transmitted in the overlapping areas and the other areas than the overlapping areas at different transmittivities, thus resulting in non-uniformity of the picture being displayed. Furthermore the thicker overlapping areas of the touch electrode structure made uneven have to be away from pixel elements of the display panel while the touch electrode structure is being integrated with the display panel, so as to avoid the electrodes from being visible, and optical uniformity thereof from being degraded, thus undoubtedly making the process more difficult.

Optionally the total thicknesses of the second insulating medium, and the first connecting sections and the second connecting sections in the overlapping areas are equal to the thickness of the first touch electrodes or the second touch electrodes.

The total thicknesses of the second insulating medium, and the first connecting sections and the second connecting sections in the overlapping areas are equal to the thickness of the first touch electrodes or the second touch electrodes, so that the thickness of the overlapping areas is made exactly the same as the thickness of the other areas than the overlapping areas, thus resulting in the touch electrode structure with a planar surface, good uniformity of the thickness, and good optical uniformity.

Optionally there are grooves in the second insulating medium that correspond to the overlapping areas, where the first connecting sections or the second connecting sections in the overlapping areas are located in the grooves.

Figure 5:
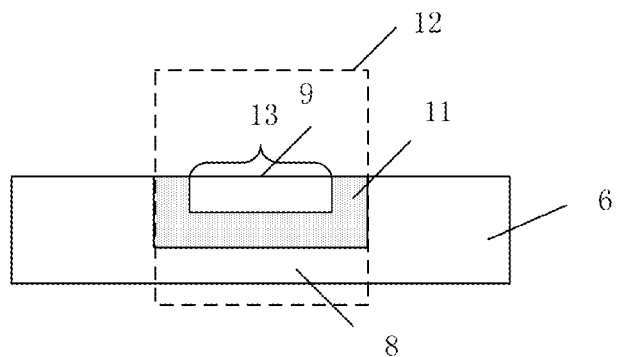
FIG. 5 is a schematic structural diagram of a second touch electrode structure in an overlapping area according to an embodiment of the invention.

As illustrated in FIG. 5, there is such a groove 13 in the second insulating medium 11 that corresponds to the overlapping area 12, where the second connecting section 9 in the overlapping area 12 is located in the groove 13.

Optionally the thickness of the second insulating medium outside the grooves is equal to the sum of the thickness of the second insulating medium in the overlapping areas, and the thickness of the first connecting sections or the second connecting sections located in the grooves, in the overlapping areas.

Figure 6:
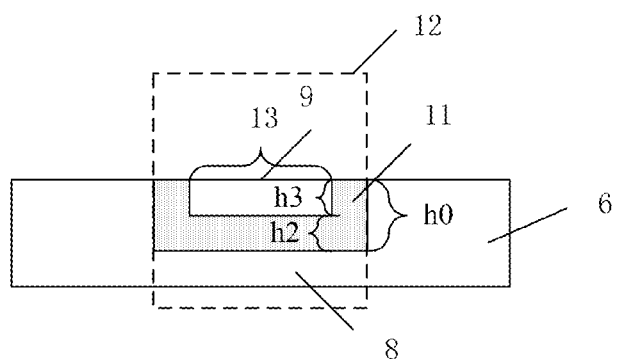
FIG. 6 is a schematic structural diagram of a third touch electrode structure in an overlapping area according to an embodiment of the invention.

As illustrated in FIG. 6, the thickness of the second insulating medium outside the grooves is h0, the thickness of the second insulating medium in the overlapping area is h2, and the thickness of the second connecting section located in the groove is h3, where h0=h2+h3. With this design, the thickness of the overlapping area is ensured to be equal to the thickness of the first touch electrode or the second touch electrode on one hand, and the first connecting section and the second connecting section are ensured to be well insulated from each other on the other hand to thereby enable a touch function normally.

Optionally all of the thicknesses of the second insulating medium, the first connecting section, and the second connecting section in the overlapping areas are one third of the thickness of the first touch electrodes; or All of the thicknesses of the second insulating medium, the first connecting section, and the second connecting section in the overlapping areas are one third of the thickness of the second touch electrodes.

Figure 7:
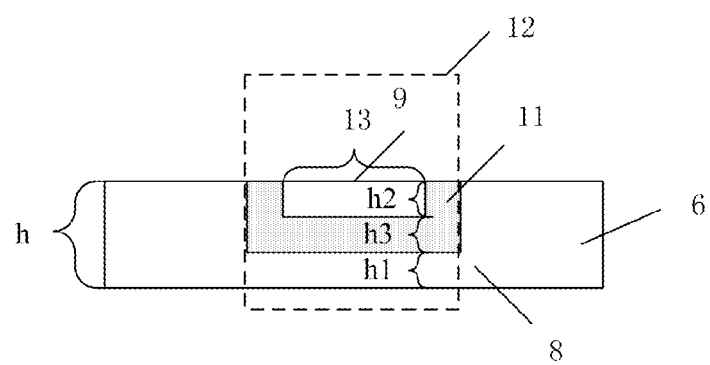
FIG. 7 is a schematic structural diagram of a fourth touch electrode structure in an overlapping area according to an embodiment of the invention.

As illustrated in FIG. 7, the thickness of the first touch electrode is h, and in the overlapping area, the thickness of the second insulating medium is h3, the thickness of the first connecting section is h1, and the thickness of the second connecting section is h2, all of which are h/3, that is, h1=h2=h3. It shall be noted that in the technical solution according to this embodiment of the invention, ideally the thickness h3 of the second insulating medium, the thickness h1 of the first connecting section, and the thickness h2 of the second connecting section are made, but their thicknesses in a real product will vary due to an inevitable process error without departing from the scope of this embodiment of the invention. In this embodiment, the thickness h3 of the second insulating medium, the thickness h1 of the first connecting section, and the thickness h2 of the second connecting section are designed equal so that there will be good optical uniformity of the touch electrode structure.

Optionally the thicknesses of the first touch electrodes and the second touch electrodes are the same.

Optionally the first insulating medium and the second insulating medium are transparent insulating mediums. In this way, the light-transmitting effect of the touch electrode structure can be improved.

Optionally the first touch electrodes and the second touch electrodes are made of ITO.

Optionally the first connecting sections and the second connecting sections are made of ITO. In this way, deficiencies in the prior art, such as a light-tight deficiency due to shield of bridge metal wires, a deficiency where bridge metal wires are visible as a result of light reflection caused by metal can be avoided, thus improving the freedom in integrating the touch electrode structure with the display panel.

Optionally the first insulating medium and the second insulating medium are made of silicon nitride or silicon oxide.

It shall be noted that the first insulating medium and the second insulating medium are preferably made of a material with an optical refractive index similar to the refractive index of ITO, thus improving optical uniformity. The first insulating medium and the second insulating medium can alternatively be made of Optically Clear Adhesive (OCA). There is a high optical transmittivity of OCA, and the first insulating medium and the second insulating medium are made of OCA so that the first touch electrodes and the second touch electrodes can be insulated from each other in effect on one hand, and the first touch electrodes and the second touch electrodes will not be separated by an external force from each other due to the adhesion of OCA on the other hand to thereby enable the touch function of the touch electrode structure.

Figure 8:
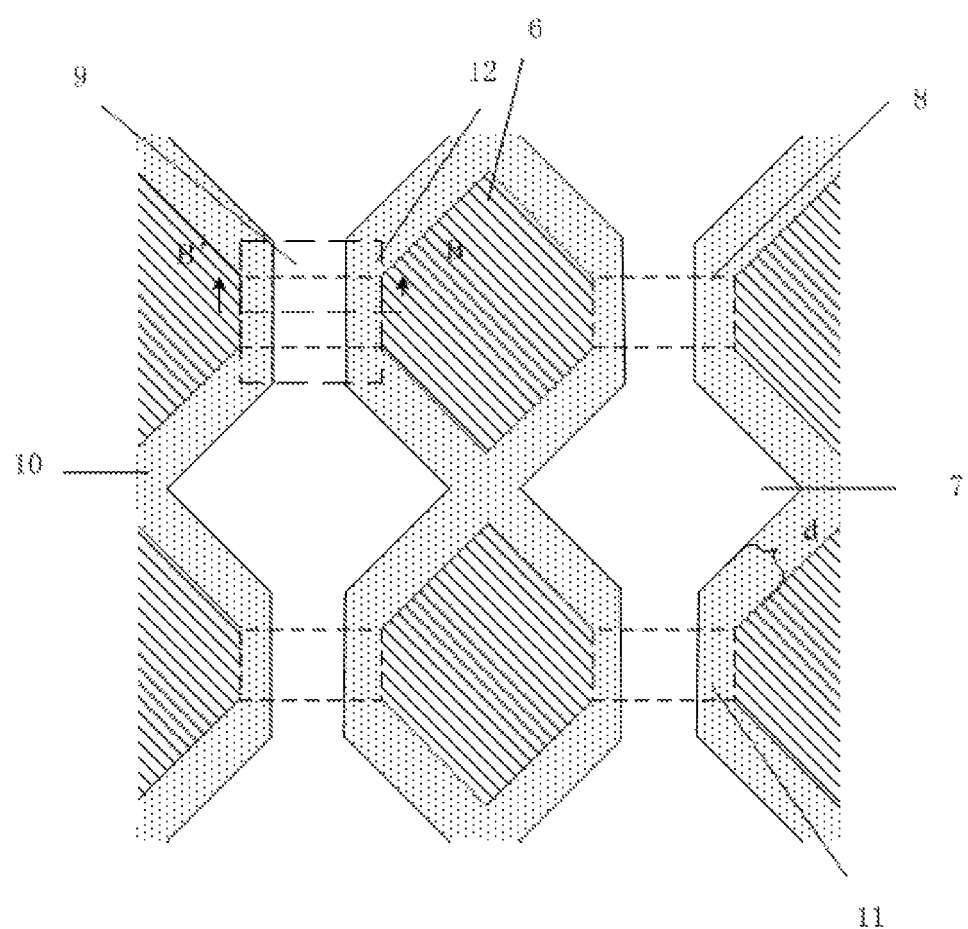
FIG. 8 is a schematic diagram of the distance between a first touch electrode and a second touch electrode in a touch electrode structure according to an embodiment of the invention.

Optionally as illustrated in FIG. 8, there is a distance d less than 5 micrometers between the adjacent first touch electrodes and second touch electrodes.

It shall be noted that since there is the first insulating medium arranged between the first touch electrodes and the second touch electrodes, the distance between the adjacent touch electrodes can be reduced without incurring any short circuit to thereby improve the touch sensitivity, as compared with the prior art. Optionally the distance d between the adjacent first touch electrodes and second touch electrode ranges from 3 to 5 micrometers.

Figure 9:
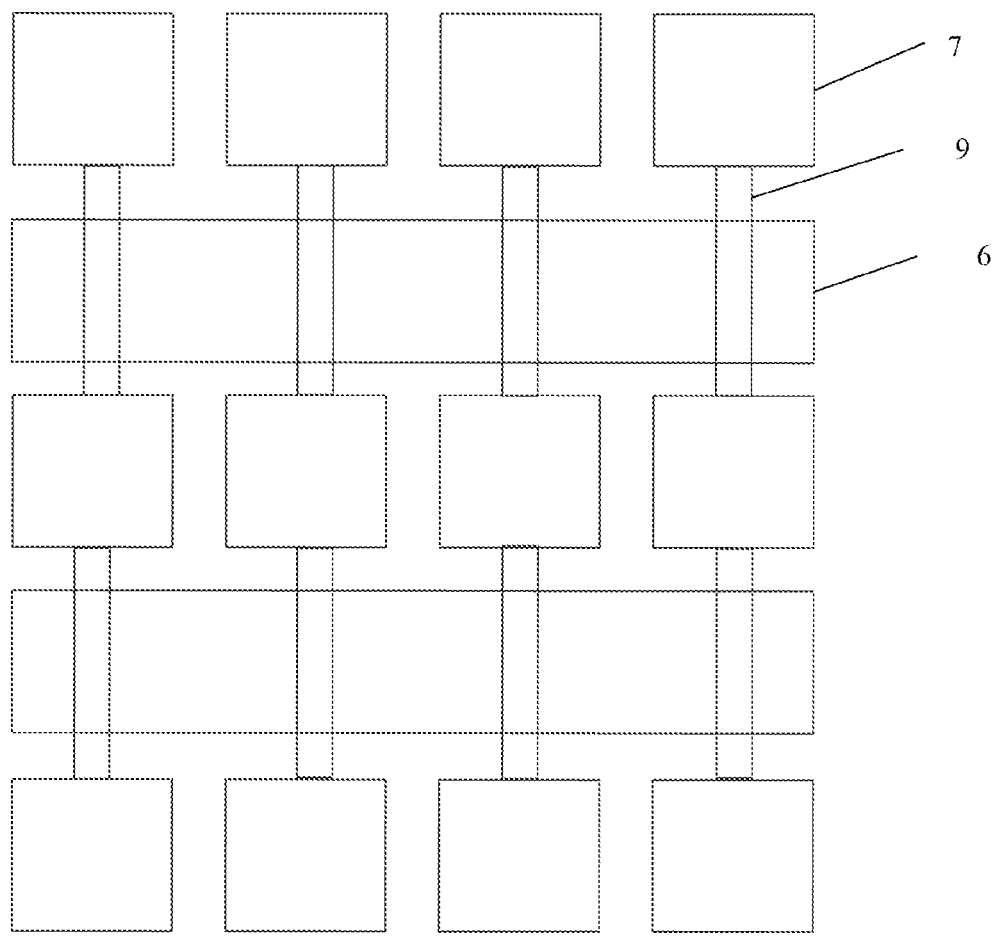
FIG. 9 is a schematic diagram of a fifth touch electrode structure according to an embodiment of the invention.

It shall be noted that the shapes of the first touch electrodes and the second touch electrodes will not be limited to the shapes illustrated in FIG. 3 to FIG. 8, but can alternatively be other shapes; and as illustrated in FIG. 9 (where the first insulating medium and the second insulating medium are not illustrated), the second touch electrodes 7 are shaped in a square, the second connecting sections 9 are connected with the second touch electrodes 7, and the first touch electrodes 6 and the first connecting sections are formed integrally into a strip.

Figure 10:
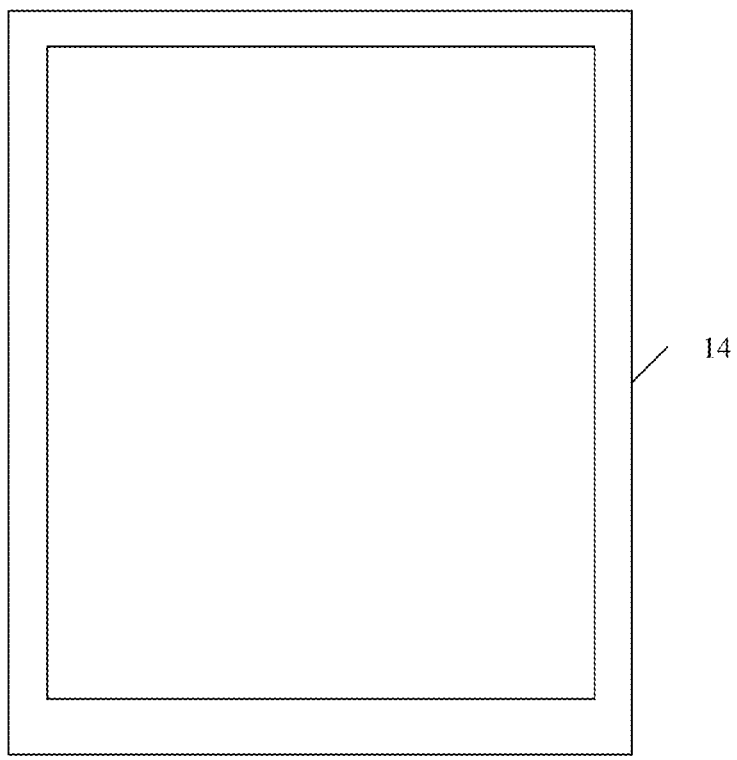
FIG. 10 is a schematic diagram of a touch pad according to an embodiment of the invention.

As illustrated in FIG. 10, a touch panel 14 according to an embodiment of the invention includes the touch electrode structure above.

Figure 11:
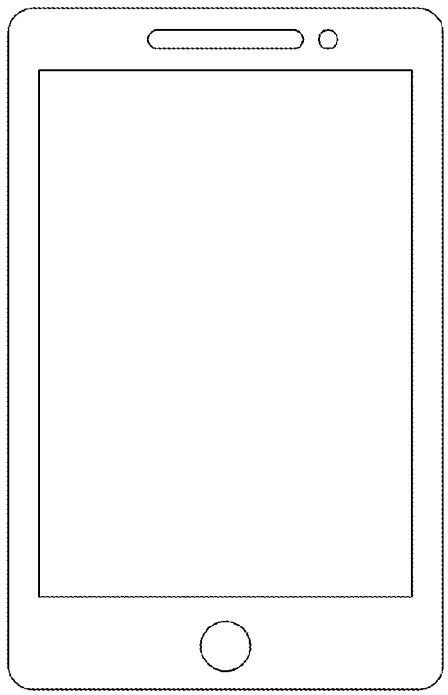
FIG. 11 is a schematic diagram of a display device according to an embodiment of the invention.

A display device according to an embodiment of the invention includes the touch panel above. As illustrated in FIG. 11, the display device can be a mobile phone.

Figure 12:
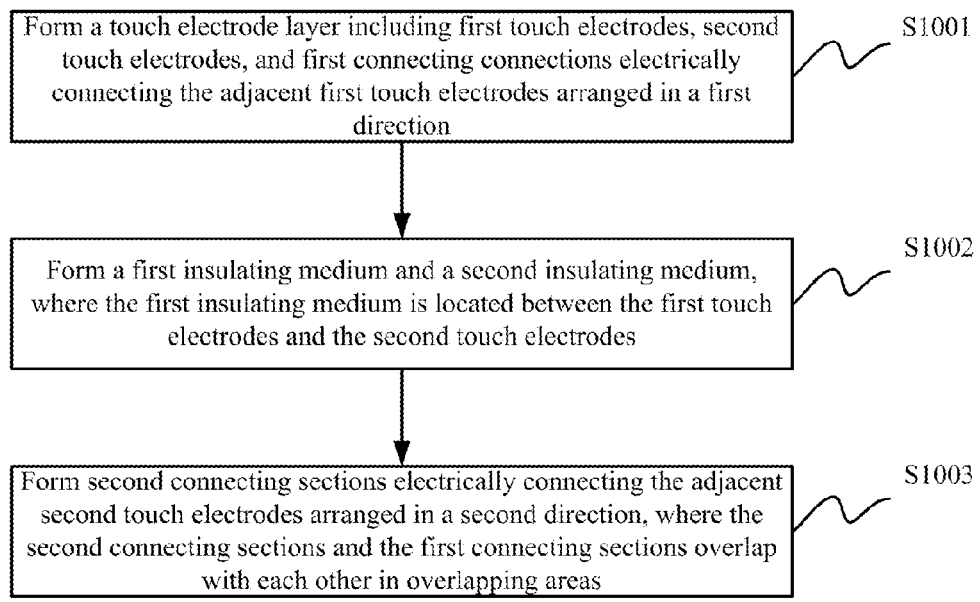
FIG. 12 is a flow chart of a method for fabricating a touch electrode structure according to an embodiment of the invention.

As illustrated in FIG. 12, a method for fabricating the touch electrode structure above according to an embodiment of the invention includes the following steps:

The step S1001 is to form a touch electrode layer including first touch electrodes, second touch electrodes, and first connecting connections electrically connecting the adjacent first touch electrodes arranged in a first direction;

The step S1002 is to form a first insulating medium and a second insulating medium, where the first insulating medium is located between the first touch electrodes and the second touch electrodes; and The step S1003 is to form second connecting sections electrically connecting the adjacent second touch electrodes arranged in a second direction, where the second connecting sections and the first connecting sections overlap with each other in overlapping areas;

The second insulating medium insulates the first connecting sections and the second connecting sections from each other; and Each of a thickness of the second insulating medium, a thickness of the first connecting sections in the overlapping areas and a thickness of the second connecting sections in the overlapping areas is not only less than a thickness of the first touch electrodes, but also less than a thickness of the second touch electrodes.

Optionally the forming the touch electrode layer includes: forming a first touch electrode layer through vapor-plating, and forming the first touch electrodes, the second touch electrodes, and the first connecting sections using a half-tone mask.

Optionally the forming the first insulating medium and the second insulating medium includes: forming an insulating layer through atom-deposition; and Forming the first insulating medium and the second insulating medium using a half-tone mask.

Optionally the forming the second connecting sections includes: forming the second connecting sections using a half-tone mask or through ink-eject printing.

The second connecting sections can be formed through ink-eject printing, for example, by solving organic zinc and organic tin in organic solvent, filling the solvent in grooves through ink-eject printing, and forming solid ITO after the solvent is volatilized.

The method for fabricating a touch electrode structure according to this embodiment of the invention will be described by way of an example where all of the first touch electrodes, the second touch electrodes, the first connecting sections, and the second connecting sections are made of ITO, and the first touch electrodes and the first connecting sections are formed integrally.

Figure 13:
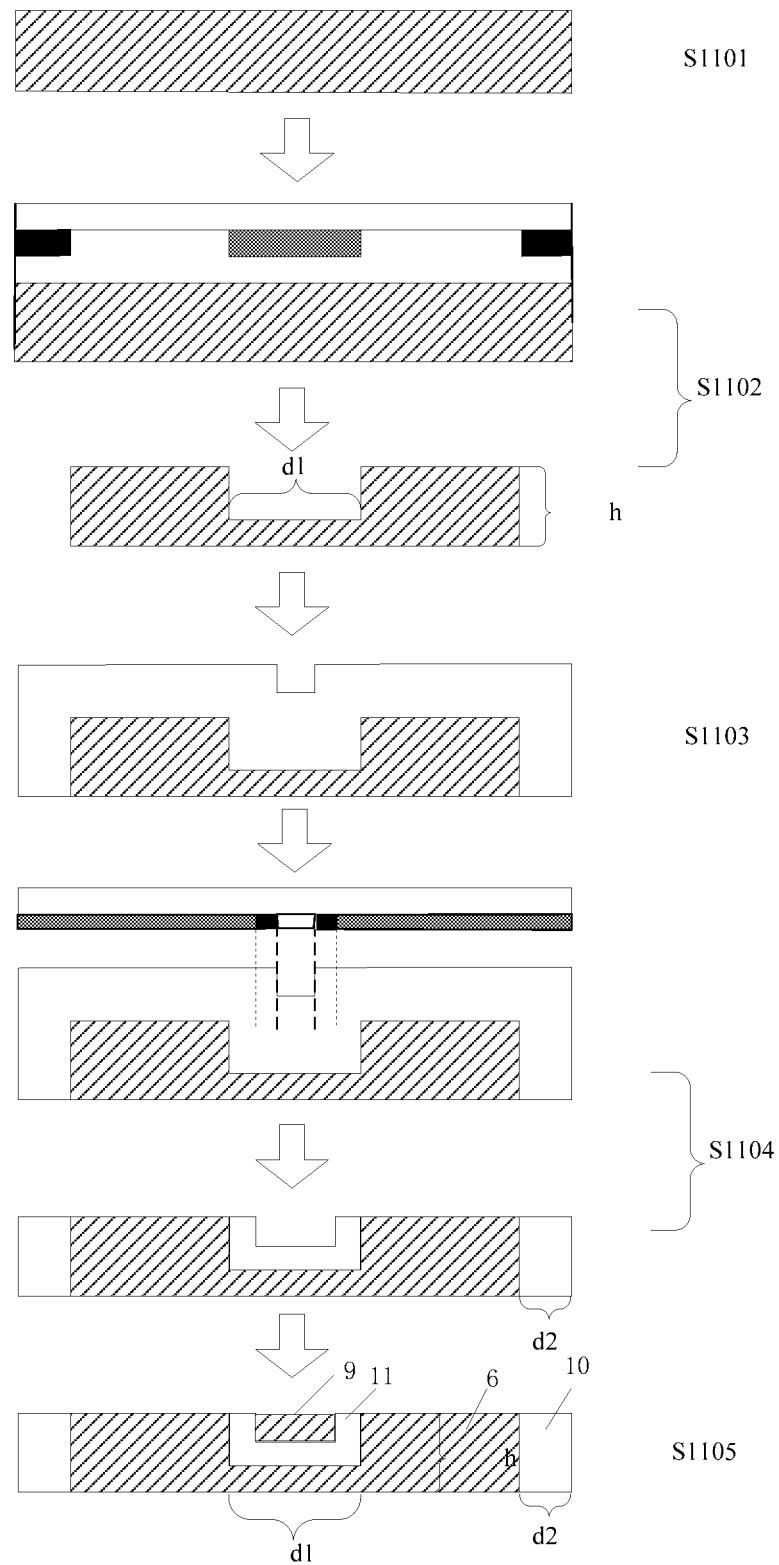
FIG. 13 is a schematic chart of another method for fabricating a touch electrode structure according to an embodiment of the invention.

As illustrated in FIG. 13, the method for fabricating a touch electrode structure particularly includes the followings steps:

The step S1101 is to form an ITO electrode layer through vapor-plating;

The step S1102 is to form the first touch electrodes, the second touch electrodes, and the first connecting sections using a half-tone mask;

ITO components with different thicknesses are formed using the half-tone mask, where the thicknesses h of the first touch electrodes and the second touch electrodes are 0.1 micrometer, and the width d1 of grooves is 10 micrometers; and the middle grooves correspond in position to semitransmitting areas of the mask, and the grooves are etched to such a depth that is dependent upon the optical transmittivity of the mask;

The step S1103 is to form an insulating layer through atom-deposition;

The step S1104 is to form the first insulating medium and the second insulating medium using a half-tone mask;

The width d2 of the first insulating medium formed in the step S1104 is 3.5 micrometers; and The step S1105 is to form the second connecting sections using a half-tone mask or through ink-eject printing.

In summary, with the touch electrode structure, the touch panel, the display device, and the method for fabricating a touch electrode structure according to the embodiments of the invention, the first insulating medium is arranged between the first touch electrodes and the second touch electrodes so that the touch electrode structure can be made planar as a whole; and the thickness of the second insulating medium, and the thicknesses of the first connecting sections and the second connecting sections are made smaller in the overlapping areas to thereby reduce the thickness of the overlapping areas as compared with the prior art so as to improve the planarity of the surface of the touch electrode structure, and the uniformity of the thicknesses of the touch electrodes, thus resulting in optical uniformity of the touch electrode structure.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A touch electrode structure, comprising first touch electrodes and second touch electrodes alternately arranged at a same layer, wherein the touch electrode structure further comprises:
   first connecting sections electrically connecting adjacent first touch electrodes arranged in a first direction; and
   second connecting sections electrically connecting adjacent second touch electrodes arranged in a second direction, wherein the first connecting sections and the second connecting sections overlap with each other in overlapping areas;
   there are such a first insulating medium between the first touch electrodes and the second touch electrodes that insulates the first touch electrodes and the second touch electrodes from each other;
   there are such a second insulating medium between the first connecting sections and the second connecting sections in the overlapping areas that insulates the first connecting sections and the second connecting sections from each other; and
   each of a thickness of the second insulating medium, a thickness of the first connecting sections in the overlapping areas and a thickness of the second connecting sections in the overlapping areas is not only less than a thickness of the first touch electrodes, but also less than a thickness of the second touch electrodes;
   wherein the first touch electrodes are provided with first grooves that correspond to the overlapping areas, wherein the second insulating medium sections in the overlapping areas are located in the first grooves; an upper surface outside the first grooves of the first touch electrodes is flush with an upper surface of the second insulating medium sections.

2. The touch electrode structure according to claim 1, wherein the first touch electrodes and the first connecting sections are formed integrally, and/or the second touch electrodes and the second connecting sections are formed integrally.

3. The touch electrode structure according to claim 1, wherein the thicknesses of the second touch electrodes, the first touch electrodes, and the first insulating medium are same.

4. The touch electrode structure according to claim 1, wherein a difference between the total thickness of the second insulating medium, the first connecting sections, and the second connecting sections in the overlapping areas, and the thickness of the second touch electrodes is less than or equal to 15% of the thickness of the second touch electrodes; or
   the difference between the total thickness of the second insulating medium, and the first connecting sections, and the second connecting sections in the overlapping areas, and the thickness of the first touch electrodes is less than or equal to 15% of the thickness of the first touch electrodes.

5. The touch electrode structure according to claim 4, wherein a total thickness of the second insulating medium, and the first connecting sections and the second connecting sections in the overlapping areas is equal to the thickness of the first touch electrodes or the second touch electrodes.

6. The touch electrode structure according to claim 5, wherein the second insulating medium is provided with second grooves that correspond to the overlapping areas, wherein the first connecting sections or the second connecting sections in the overlapping areas are located in the second grooves.

7. The touch electrode structure according to claim 6, wherein a thickness of the second insulating medium outside the second grooves is equal to a sum of a thickness of the second insulating medium in the overlapping areas, and a thickness of the first connecting sections or the second connecting sections located in the second grooves, in the overlapping areas.

8. The touch electrode structure according to claim 5, wherein all of the thicknesses of the second insulating medium, the first connecting section, and the second connecting section in the overlapping areas are one third of the thickness of the first touch electrodes; or
   all of the thicknesses of the second insulating medium, the first connecting section, and the second connecting section in the overlapping areas are one third of the thickness of the second touch electrodes.

9. The touch electrode structure according to claim 4, wherein the thicknesses of the first touch electrodes and the second touch electrodes are same.

10. The touch electrode structure according to claim 1, wherein the first insulating medium and the second insulating medium are formed integrally.

11. The touch electrode structure according to claim 1, wherein the first insulating medium and the second insulating medium are transparent insulating mediums.

12. The touch electrode structure according to claim 1, wherein the first touch electrodes and the second touch electrodes are made of ITO.

13. The touch electrode structure according to claim 1, wherein the first insulating medium and the second insulating medium are made of silicon nitride or silicon oxide.

14. The touch electrode structure according to claim 1, wherein there is a distance d less than 5 micrometers between the adjacent first touch electrodes and second touch electrodes.

15. A touch panel, comprising the touch electrode structure according to claim 1.

16. A method for fabricating the touch electrode structure, wherein the method comprises:
   forming a touch electrode layer comprising first touch electrodes, second touch electrodes, and first connecting connections electrically connecting adjacent first touch electrodes arranged in a first direction; the first touch electrodes are provided with first grooves;
   forming a first insulating medium and a second insulating medium, wherein the first insulating medium is located between the first touch electrodes and the second electrodes; and
   forming second connecting sections electrically connecting adjacent second touch electrodes arranged in a second direction, wherein the second connecting sections and the first connecting sections overlap with each other in overlapping areas; the overlapping areas correspond to the first grooves;
   the second insulating medium insulates the first connecting sections and the second connecting sections from each other; and
   each of a thickness of the second insulating medium, a thickness of the first connecting sections in the overlapping areas and a thickness of the second connecting sections in the overlapping areas is not only less than a thickness of the first touch electrodes, but also less than a thickness of the second touch electrodes;
   wherein an upper surface outside the first grooves of the first touch electrodes is flush with an upper surface of the second insulating medium sections.

17. The method according to claim 16, wherein the forming the touch electrode layer comprises: forming a first touch electrode layer through vapor-plating, and forming the first touch electrodes, the second touch electrodes, and the first connecting sections using a half-tone mask.

18. The method according to claim 16, wherein the forming the first insulating medium and the second insulating medium comprises: forming an insulating layer through atom-deposition; and
   forming the first insulating medium and the second insulating medium using a half-tone mask.

19. The method according to claim 16, wherein the forming the second connecting sections comprises: forming the second connecting sections using a half-tone mask or through ink-ejecting and printing.

* * * * *